Oct. 29, 1929.　　　　　C. W. VOGT　　　　　1,733,740
APPARATUS FOR MANUFACTURING ICE CREAM AND THE LIKE
Filed Jan. 18, 1927　　　4 Sheets-Sheet 3
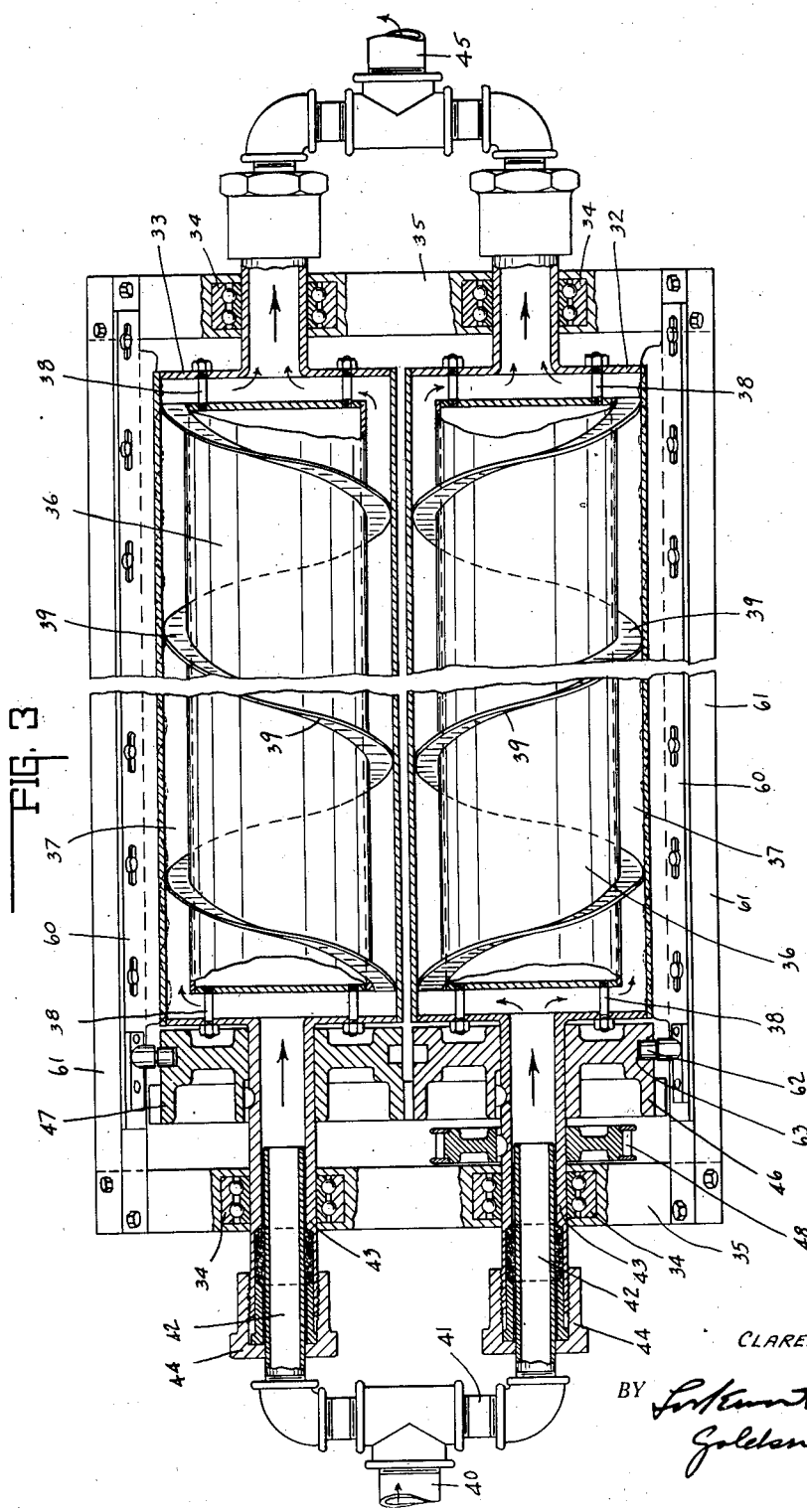
INVENTOR.
CLARENCE W. VOGT.

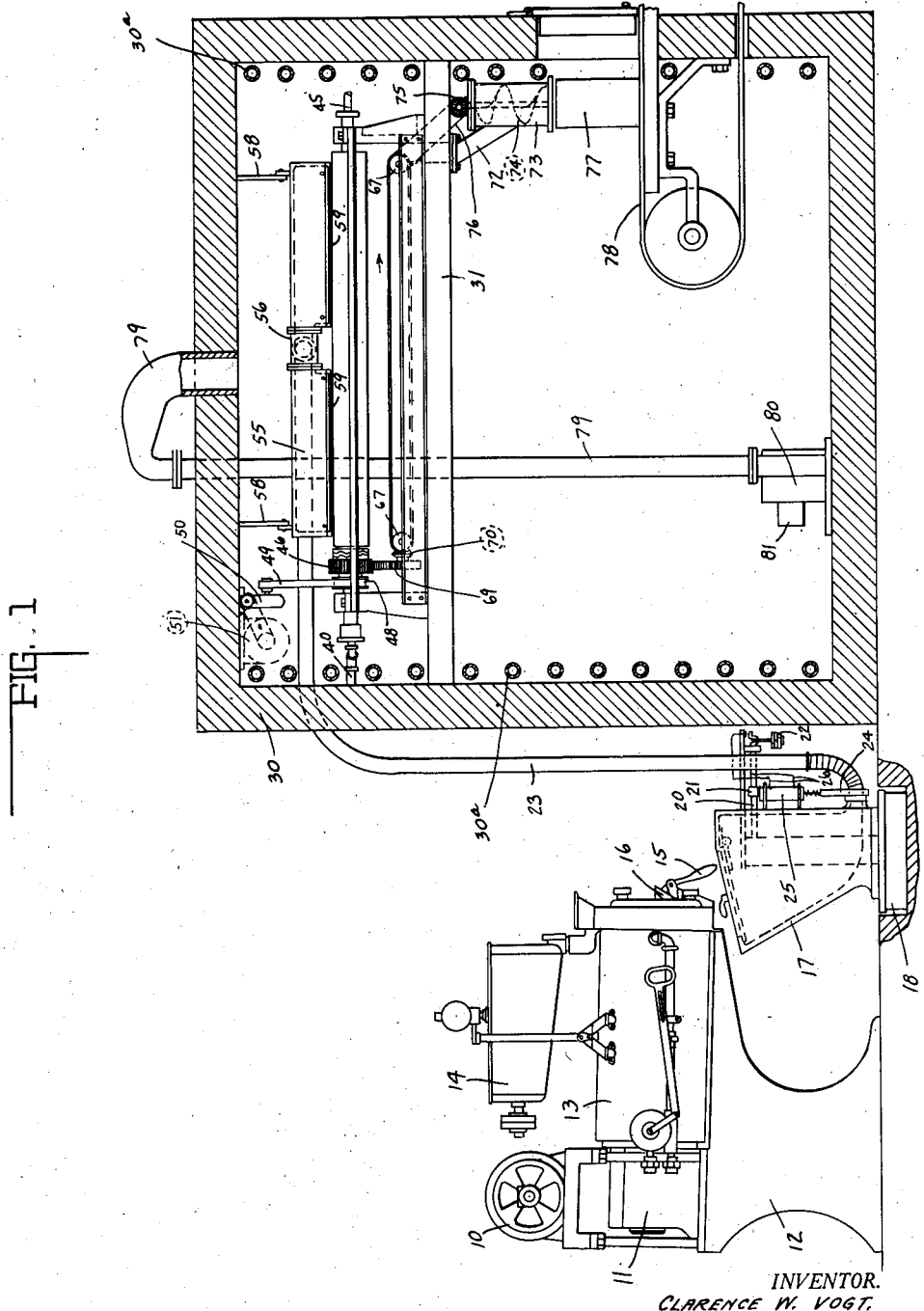

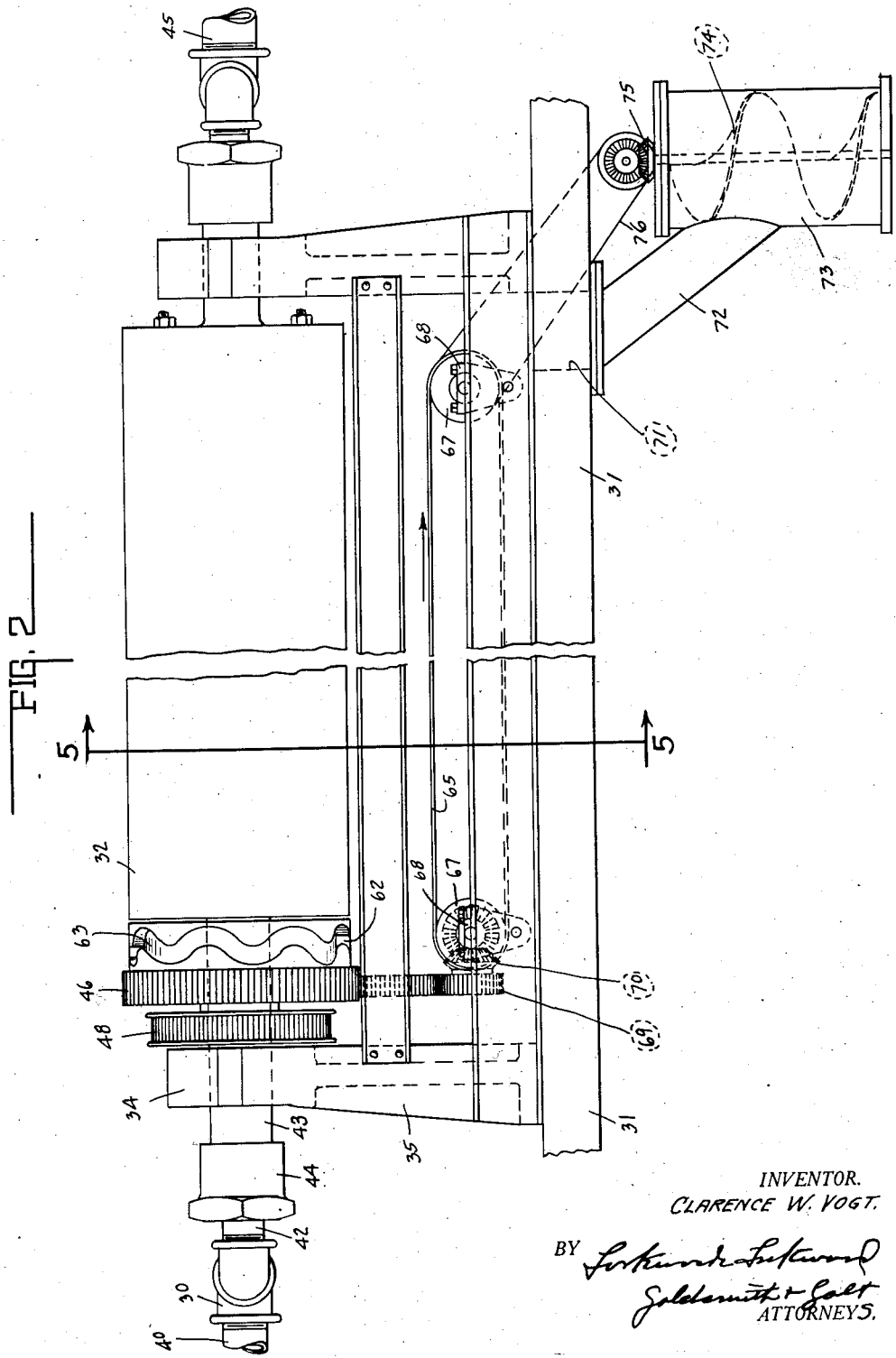

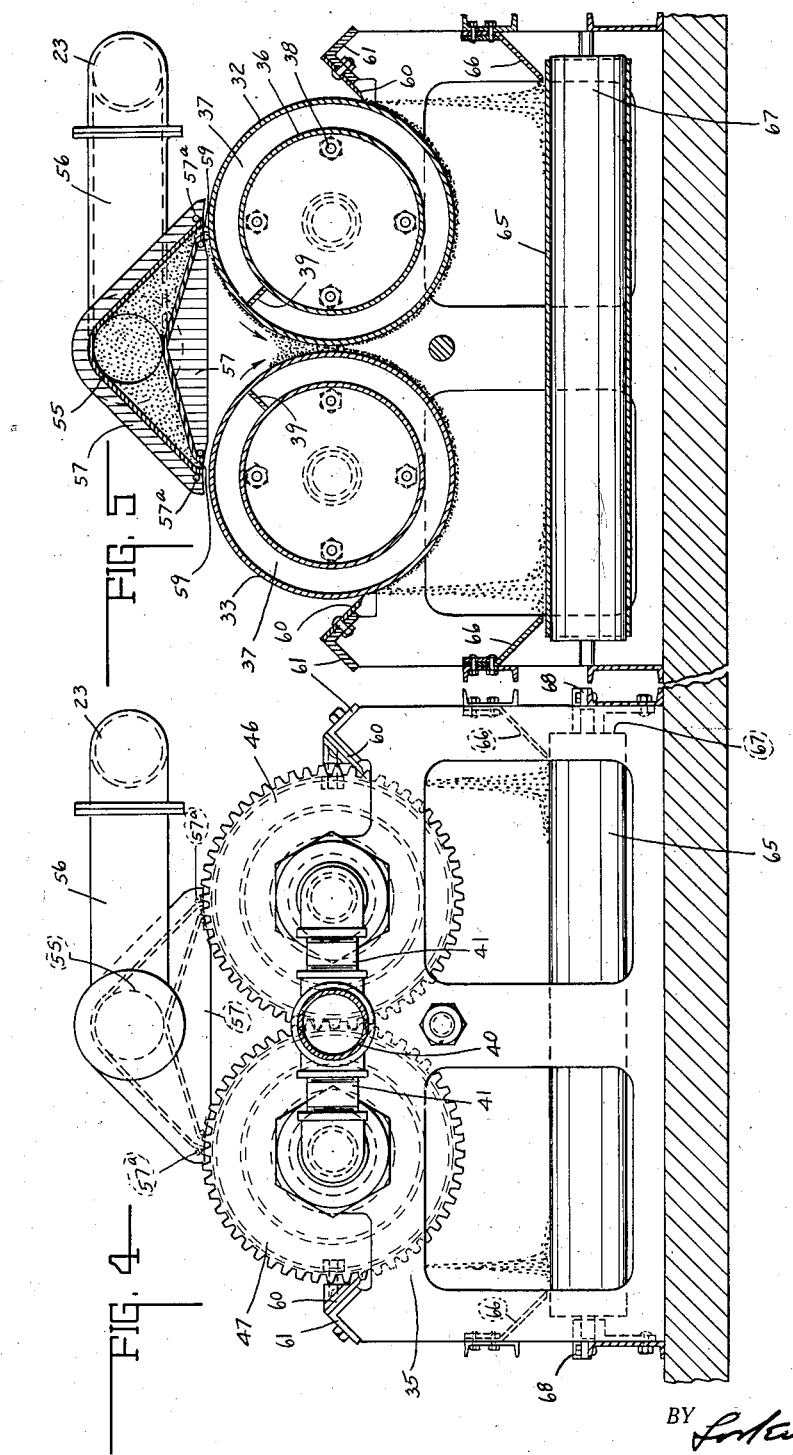

Patented Oct. 29, 1929

1,733,740

UNITED STATES PATENT OFFICE

CLARENCE W. VOGT, OF LOUISVILLE, KENTUCKY, ASSIGNOR TO VOGT INSTANT FREEZERS, INCORPORATED, OF LOUISVILLE, KENTUCKY, A CORPORATION OF DELAWARE

APPARATUS FOR MANUFACTURING ICE CREAM AND THE LIKE

Application filed January 18, 1927. Serial No. 161,344.

This invention pertains to apparatus for manufacturing ice cream, ices or similar frozen liquids and confections, and involves an arrangement of parts whereby the material is first mixed, aerated, and semi-frozen in a plastic state, and then continuously passed through and delivered from that part of the apparatus in which the hardening is effected.

Heretofore it has been customary in the manufacture of ice cream and the like to mix the same, lowering its temperature to such a degree that it will be in a semi-frozen or plastic state, and thereafter place such mixture in suitable containers, molds or the like, which are then allowed to remain standing in a freezing or hardening room until frozen to a solidified condition. This has been accomplished by the placing of such molds or containers on racks in the freezing or hardening room.

In my improved apparatus there is provided a hardening chamber having conveying means therein for continuously advancing the semi-frozen and aerated material during the hardening operation. The material instead of being in a large mass, for instance in cans, is of such thickness that during its time of travel under the influence of the intense refrigerating action it is hardened by the time it reaches the point of delivery.

One of the principal objects of this invention is to freeze the semi-frozen and plastic mixture into a substantially solid state, as a continuous and rapid operation, thus eliminating the necessity for letting the semi-frozen material stand for a number of hours in the hardening room. By this means there is considerable saving of time and handling by this more rapid means of freezing, as well as enabling the manufacture of ice cream and the like to be conducted in a continuous process and thus facilitating production.

A further important feature of the invention resides in the freezing of the mixture under a partial vacuum or in a chamber in which a partial vacuum is maintained, as will be hereinafter more fully set forth and described.

More specifically the invention pertains to an apparatus for freezing ice cream or the like wherein the freezer for whipping air into the mix and freezing it to a semi-plastic state is so arranged or constructed as to be capable of continuously delivering such semi-plastic mix with the proper overrun into a hardening room or chamber upon a conveying or freezing surface or the like such as will continuously convey or advance the mix within or through the chamber while it gradually becomes hardened through the medium of the low degree of temperature, whereby it may be continuously delivered from said hardening room for use, thus greatly facilitating the rapidity with which ice cream or the like may be manufactured.

Thus, the mix may be delivered onto a continuously moving conveyor within the hardening chamber from either one or more batteries of freezers, the conveyor being of such character that the semi-frozen mix is hardened through contact with the cold surface thereof or the low temperature of the air through which it passes, it some instances, the refrigerant being on one side of the conveyor surface while the semi-frozen aerated mix is supported on the other side thereof.

Other features and advantages of this machine and the process employed thereby will be more specifically pointed out and become apparent from the accompanying drawings and the following description and claims:

In the drawings, Figure 1 is a side elevation showing the refrigerating room in section. Fig. 2 is an enlarged view showing a side elevation of the refrigerating rolls with the central portion thereof broken away. Fig. 3 is the same as Fig. 2, showing a plan view thereof with parts illustrated in cross section. Fig. 4 is an end elevation of the rolls. Fig. 5 is a section taken on the line 5—5 of Fig. 2 with the addition of the spreader mounted thereabove.

In the drawings, there is shown an ice cream freezer of the heavy duty commercial type, comprising a driving motor 10, gear housing 11, base 12, freezing chamber 13 and batch weigher reservoir 14. On the end of the chamber 13 there is a handle 15 for controlling the discharge valve 16. The above-described freezer is of a common type in commercial use and well known to the trade as being adapted to partially freeze the mix to a semi-plastic state incorporating therein the desired percentage of air by whipping or aerating the same.

Immediately below the freezer there is provided a receptacle 17 which is supported on a scale platform 18, said receptacle being adapted to receive a batch of semi-frozen mixture as it is discharged from the freezer. The scale platform 18 is connected in the usual manner with the scale beam 20 provided with an adjusting weight 21 and the removable weights 22. The lower end of the receptacle 17 is in open communication with a vacuum delivery pipe 23, the same being controlled by a valve 24. Said valve is connected with a double solenoid 25, which, in turn, has its opposed coils connected in the usual manner with a source of current, while the other terminals of the respective coils are connected through the wires 26 with a contact on top of the beam 20 and one on the lower side thereof respectively. The source of current is connected with the scale, whereby a current is directed through the upper solenoid for lifting and opening the valve when a batch of mixture is dropped into the receptacle 17 sufficient to cause the end of the beam to be raised so that contact will be made by the top thereof, and a reverse action for closing the valve will be caused by the energizing of the lower reverse solenoid upon the mixture being withdrawn from the receptacle so as to relieve the weight and allow the beam to drop down, making contact through the lower side thereof. However, various other means for controlling a valve may be employed, such as to cause the valve to close when there is no pressure to be drawn therethrough, and opened when the mixture is received by the receptacle. The purpose of this arrangement is to provide a continuous source of supply to the hardening chamber to permit of continuous hardening of the semi-plastic mix.

Adjacent the freezer there is a refrigerating room or chamber formed by the walls 30 and properly insulated in the usual manner to retain the cold air, said chamber being maintained at a low temperature through the medium of the usual refrigerating system of brine pipes 30ª. Positioned near the top of the chamber there is a platform 31 upon which the refrigerating rolls are mounted. As shown in Fig. 3, there are provided two rolls 32 and 33, rotatably supported by the bearings 34 in the standards 35.

The rolls comprise an outer drum and inner drum 36 spaced therefrom so as to provide an annular refrigerant chamber 37 as shown in Figs. 3 and 5, the drums 36 being entirely closed to prevent any entrance therein of the refrigerating brine, and being rigidly secured to the ends of the rolls by the bolts 38. Surrounding the drums 36 there are spiral vanes 39 which extend from the drums 36 to the inner surface of the outer peripheries of the rolls. The chamber 37 is in communication with the brine pipe 40, leading from any suitable source of supply of the usual character. Brine is permitted to pass from the pipe through a header 41 which is in communication with both rolls 32 and 33 and through the pipes 42 which extend into the hollow spindles 43 mounted in the bearings 34, the connection therebetween having a suitable packing box 44 so as to permit relative rotation therebetween. The brine is forced in under sufficient pressure to cause it to be guided about the periphery of the drum 36 by the vanes 39 and discharged through the other end of each of the rolls which communicate with an outlet 45 in the same manner as above described with respect to the connection with the inlet 40. By reason of this arrangement, each of the rolls is cooled to a low degree of temperature, sufficient for causing the semi-frozen mixture which may come in contact with the surface thereof to be almost instantly frozen to solidity.

Each roll is provided on its end with suitable gears 46 and 47, shown in Fig. 4, one of said gears having associated therewith, as shown in Figs. 2 and 3, a belt-driven pulley 48 which may be driven by a belt 49 through the reduction gears 50 by a motor 51, as shown in Fig. 1. By means of suitable reduction gearing 51, the speed of rotation of the rolls may be controlled for the purpose which will be hereinafter described. It will further be noted that the rolls will rotate in opposite directions as will be indicated by the arrows in Fig. 5.

Mounted directly over the rolls there is a discharge header or manifold 55 which is connected with the delivery pipe 23 through a central T-connection 56. The manifold is well insulated by the insulating packing 57, as shown in Figs. 4 and 5, and is supported from the top of the chamber by the hangers 58. Communicating with the manifold 55 there is a plurality of laterally-directed discharge nozzles 59 adapted to discharge the plastic mixture directly over the top of the refrigerating rolls, as shown in Fig. 5, throughout substantially the whole length thereof. Upon the mixture being distributed over the top surface of the rolls and coming in contact therewith in a comparatively thin film, the extremely low temperature of the surface causes the same to be frozen and solidified thereon. This action causes the mixture to adhere to the surface in its frozen state and be carried thereby past the point of nearest approach of the two cylinders. In this connection, it will be noted that the cylinders are spaced apart a given distance equal to double the desired thickness of the coating so that any excess mixture will be spread over the surface of the rolls, whereby the thickness of the coating will not be such as to prevent complete solidification.

In order to prevent untimely freezing of the mixture about the ends of the nozzles 59, where they approach the cold surface of the rolls 32 and 33, there are inserted adjacent thereto electrically-heated resistance wires 57ª within the insulating material and directly adjacent the metal nozzle.

As the frozen mixture is carried about the rolls, it is removed therefrom by the knives 60, which are positioned as shown in Figs. 3 and 5, on opposite sides of the rolls and supported on the side brackets 61. The knives are so supported as to permit them to be reciprocated longitudinally of the support, and are provided with a scalloped knife edge, shown in dotted lines in Fig. 3, so as to rather cut the frozen mixture from the rolls than scrape it therefrom. A reciprocatory action is imparted to the knives by reason of the projection 62 secured thereto engaging in a cam 63 formed integral with the gears 46 and 47, as best illustrated in Figs. 2 and 3.

It will be seen that the cylinder walls act as conveyors to carry the material from the delivery nozzles to the knives or scrapers, that is, they continuously advance it while it is being hardened from the semi-frozen condition in which it existed at the nozzles, to a more nearly solid condition. As the material is of no great thickness the hardening action is quickly effected. With the conveying surface also acting as a freezing surface, there is a rapid heat transfer from the material on one side of the conveyor to the brine on the other side.

As shown in Fig. 5, the frozen and solidified layer or coating of the mixture will thus be cut from the surface of the rolls and caused to drop upon a conveying belt 65, the sides of the belt being covered by the deflecting plates 66. The belt is mounted upon the rollers 67 which are rotatably supported in the brackets 68, and rotated through the medium of a gear 69 meshing with the gear 46 and the bevel gears 70.

As the material is caused to drop from the surface of the hardening rolls onto the conveyor belt 65 it is advanced by said belt through the chamber while the hardening process continues due to the action of the extremely cold air in the hardening room which is cooled to a low degree by the pipes 30ª and cylinders 32 and 33. Thus, there is illustrated herein two means of hardening the material, one means consisting of the refrigerating surface which advances the material within the chamber as in the case of the cylinders 32 and 33, while the other means consists of the conveyor belt which advances the material within said chamber while it is hardened by the low temperature of the air contained therein. The belt travels in the direction of the arrow, as shown in Fig. 2, and dumps the material through an opening 71 in the supporting platform 31, said opening being in direct communication with a discharge spout 72 which carries it into the feeding and compression chamber 73. The chamber 73 is provided with a screw feed 74 driven through the medium of suitable gears 75 and a belt 76 driven from the adjacent roller 67.

The feeding and compression chamber 73 is so arranged as to permit the attachment therewith of a mold or container 77 for receiving the mixture in its final frozen and solid state. Such container may be in the form of a commercial ice cream can into which the frozen ice cream is forced and packed by the feed screw, or it may be in the form of a mold for forming it to the desired shape, after which it may be discharged onto a conveyor belt 78 to carry it from the chamber. The timing of the whole apparatus may be such that the discharge of the batch from the freezer will cause a steady flow of the proper amount of mixture to the freezing rolls, so that the container or mold 77 will be packed under compression at given intervals of time, after which it will be replaced by an empty container, this feature of packing not forming a part of this invention.

In operation, a vacuum is maintained in the upper compartment. As shown herein the vacuum pump 80 is mounted in the lower compartment, which is in communication with the upper compartment through the vacuum line 79. A discharge outlet 81 is provided in the lower compartment, whereby partial vacuum will be maintained in the upper compartment, but the discharge of the cold air drawn therefrom in producing a vacuum will be discharged in the lower compartment so that there will be no material loss in refrigeration. A suitable motor or source of power for driving the vacuum pump 80 may be mounted outside of the chamber or room so that no heat will be generated therein from such motor. By reason of the vacuum created thereby, the semi-frozen and plastic mixture discharged into the receptacle 17 will be drawn by suction through the delivery pipe 23 and out of the nozzles 59 of the manifold. While it would be feasible to deliver the semi-frozen and plastic mixture to the freezing rolls under pressure rather than by suction, or in other ways, whereby it will be discharged thereover, the delivery thereof by vacuum has certain advantages in that the mixture will not be unduly compressed before freezing, so as to maintain the mixture in more uniform condition. This is of importance, since the compression of the mixture in its semi-frozen state substantially decreases its bulk.

Upon the mixture being discharged over the surface of the freezing rolls, the exceedingly low temperature thereof will immediately cause the same to be frozen into a substantially solid state and will carry it around until it is cut from the rolls by means of the reciprocating knives 60. As the frozen and substantially solid particles of mixture are caused to drop on the belt in a flake-like formation, the belt carries them to the discharge opening where they pass into the conveying and compressing chamber. As the frozen or solidified mixture in its flake-like form is fed into its final container or form, it may be compressed and forced into a compact solid mass. It will be noted that the compression that takes place at the end of the operation, occurs after the mixture reaches its final frozen state, rather than while in the semi-frozen and plastic form, which is the proper time for compressing and packing the same.

The mixture is then ready for commercial use, excepting for such mechanical operations as may be desired for the particular packing and treatment of the same, and the necessity of permitting it to become frozen in the usual manner as heretofore described, is thus eliminated.

This makes possible a continuous process in the manufacture of ice cream, ices or other frozen liquids or confections without the delay heretofore necessary, and further has certain advantages in the packing and handling thereof as heretofore described.

With respect to the container 77, into which the mixture, in its flake-like frozen form, is finally packed, such container may be in the form of a mold or the like for use in the manufacture of small ice cream bricks, cakes or fancy designs. Furthermore, such deposit into a suitable container need not necessarily be done in the cold room, but may be done in a warmer room, with more comfort, by causing the mixture to pass through the wall of the cold room, as will be obvious. Furthermore, with respect to the freezing of ices and the like, the mixture may be directly spread or sprayed upon the freezing rolls in its liquid form without having previously been mixed and partially frozen into a semi-frozen plastic form.

The invention claimed is:

1. An apparatus of the character described, comprising a chilling surface, means for maintaining said surface at a low degree of temperature, a receptacle for receiving a batch of mixture, a conduit having one end connected therewith, a valve for controlling the passage of mixture from said receptacle to said conduit, means actuated by the weight of the batch of mixture for controlling said valve, a spreading manifold connected with the other end of said conduit for discharging said mixture over the chilling surface, whereby it will become frozen and substantially solidified thereon, and means for removing said solidified mixture therefrom and depositing the same in a suitable container.

2. An apparatus of the character described, comprising a chilling surface, means for maintaining said surface at a low degree of temperature, a plurality of nozzles positioned adjacent said surface for discharging a mixture thereon, whereby it will become frozen and substantially solidified, insulating packing surrounding said nozzles, heating units positioned in said insulation adjacent the discharge ends of said nozzles for preventing freezing of the mixture therein, and means for removing said solidified mixture from said surface and depositing the same in a suitable container.

3. An apparatus for freezing ice cream mix or the like, the combination with an ice cream freezer adapted to whip air into the mix and freeze the same to a semi-plastic state, of means for hardening said semi-plastic mix comprising a compartment, a freezing surface mounted therein, means for maintaining said surface at a low degree of temperature, means for maintaining a partial vacuum in said compartment and means for delivering said semi-frozen mix from said freezer into said compartment and onto said freezing surface by suction created by the partial vacuum, whereby said mix will be frozen to a solid state.

4. In an apparatus for freezing a mix of ice cream or the like, the combination with an ice cream freezer adapted to whip air into the mix and freeze it to a semi-plastic state, of means for hardening the same including a hardening compartment, means for maintaining said compartment at a low degree of temperature, means for maintaining a partial vacuum in said compartment and drawing the mix from the freezer thereto and means in said compartment for receiving the mix in its semi-plastic condition and freezing it to a hardened condition.

5. In an apparatus for freezing ice cream or the like, the combination with a freezer for whipping air into the mix and freezing it to a semi-plastic state, of means for hardening the same comprising a hardening compartment into which said mix in its semi-plastic state is adapted to be continuously delivered, means for maintaining said compartment at a low degree of temperature and means contained in said compartment for receiving said mix and freezing it to a hardened state.

6. In an apparatus for freezing ice cream or the like, the combination with a freezer for whipping air into the mix and freezing it to a semi-plastic state, of means for hardening the same comprising a hardening compartment into which said mix in its semi-plastic state is adapted to be continuously delivered, means for maintaining said compartment at a low degree of temperature, and a movable member contained in said compartment having a freezing surface for receiving said semi-plastic mix thereon, and freezing it to a hardened state.

7. An apparatus for freezing a mix of ice cream or the like, comprising a freezing surface, means for maintaining said surface at a low degree of temperature, a processing machine for incorporating air into said mix to give it the desired over-run, a spreader and means for delivering the aerated mix from said machine to said spreader, said spreader being positioned over said freezing surface for discharging said aerated mix thereon, whereby it will become frozen and substantially solidified with the air incorporated therein.

8. In an apparatus for freezing ice cream or the like, the combination with a processing machine for whipping air into the mix to be frozen, of a freezing surface, means for maintaining said surface at a low degree of temperature, means for delivering the aerated mix from the discharge end of said machine to said freezing surface, and a spreader connected with said last-mentioned means for discharging the partially frozen and aerated mix over said freezing surface in a semi-plastic state for causing the same to be hardened thereon.

9. In an apparatus for freezing ice cream or the like, the combination with a freezer for whipping air into the mix and freezing it to a semi-plastic state, of means for hardening the same comprising a hardening chamber, means for delivering said mix in its semi-plastic state to said chamber, means for maintaining said chamber at a low degree of temperature, and means in said chamber for continuously advancing the mix through said chamber during the hardening operation.

10. In an apparatus for freezing ice cream or the like, the combination with a freezer for whipping air into the mix and freezing it to a semi-plastic state, of means for hardening the same, comprising a hardening chamber, means for continuously delivering said mix in its semi-plastic state to said chamber, means for maintaining said chamber at a low degree of temperature, and means in said chamber for advancing said mix in a thin layer while subjected to the action of said low temperature, whereby the mix is hardened.

11. In an apparatus for freezing ice cream or the like, the combination with a freezer for whipping air into the mix and freezing it to a semi-plastic state, of means for hardening the same comprising a hardening chamber, means for delivering said mix in its semi-plastic state to said chamber, means for maintaining said chamber at a low degree of temperature, and a conveyor in said chamber for continuously advancing the mix within said chamber until the hardening operation is substantially completed.

12. In an apparatus for freezing ice cream or the like, the combination with a freezer for whipping air into the mix and freezing it to a semi-plastic state, of means for hardening the same comprising a hardening chamber, means for delivering said mix in its semi-plastic state to said chamber, means for maintaining said chamber at a low degree of temperature, and a combined freezing and conveying member in said chamber for continuously advancing the mix within said chamber during the hardening operation.

13. In an apparatus for freezing ice cream or the like, the combination with a freezer for whipping air into the mix and freezing it to a semi-plastic state, of means for hardening the same comprising a hardening chamber, means for continuously delivering said mix in its semi-plastic state to said chamber, means for maintaining said chamber at a low degree of temperature, and a belt conveyor in said chamber for continuously advancing the mix through said chamber during the hardening operation.

14. In an apparatus for freezing ice cream or the like, the combination with a freezer for whipping air into the mix and freezing it to a semi-plastic state, of means for hardening the same comprising a hardening chamber, means for delivering said mix in its semi-plastic state to said chamber, means for maintaining said chamber at a low degree of temperature, a combined freezing and conveying member, and a conveyor in said chamber for continuously advancing the mix within said chamber during the hardening operation.

In witness whereof, I have hereunto affixed my signature.

CLARENCE W. VOGT.